United States Patent
Eguchi

(10) Patent No.: US 7,365,638 B2
(45) Date of Patent: Apr. 29, 2008

(54) INFORMATION DEVICE

(75) Inventor: Takashi Eguchi, Fujisawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 334 days.

(21) Appl. No.: 10/565,376

(22) PCT Filed: Jun. 23, 2005

(86) PCT No.: PCT/GB2005/002460

§ 371 (c)(1),
(2), (4) Date: Jan. 23, 2006

(87) PCT Pub. No.: WO2006/000766

PCT Pub. Date: Jan. 5, 2006

(65) Prior Publication Data

US 2006/0176157 A1    Aug. 10, 2006

(30) Foreign Application Priority Data

Jun. 25, 2004    (JP)    ............... 2004-188278

(51) Int. Cl.
*B60Q 1/00*    (2006.01)
(52) U.S. Cl. .................. 340/425.5; 340/411; 362/488; 362/489
(58) Field of Classification Search ............. 340/425.5, 340/441, 446; 362/459, 488–492
See application file for complete search history.

(56) References Cited

U.S. PATENT DOCUMENTS 4,324,986 A    4/1982    Hara et al.

FOREIGN PATENT DOCUMENTS

EP    1 357 003 A    4/1982
EP    0 349 280 A    1/1990

*Primary Examiner*—Davetta W. Goins
*Assistant Examiner*—Hongmin Fan
(74) *Attorney, Agent, or Firm*—Global IP Counselors, LLP

(57) ABSTRACT

An information device for use with an engine of a vehicle includes a lighting device for providing information about a power position of the vehicle, an engine running detection device for detecting engine running, a gear shift position detection device for detecting gear shift position, and an illuminance control device for controlling illuminance of the lighting device. When a detection is made by the engine running detection device that the engine is running and by the gear shift position detection device that the gear shift position is other than in a P or N range, the illuminance control device reduces the illuminance of the lighting device compared with the illuminance of the lighting device when the gear shift position is in the P or N range.

36 Claims, 5 Drawing Sheets

INFORMATION DEVICE

CROSS-REFERENCE TO RELATED APPLICATIONS

This nonprovisional application claims priority under 35 U.S.C. §119(a) to Japanese Patent Application No. 2004-188278, filed in Japan on Jun. 25, 2004, the entire contents of which are hereby incorporated by reference.

BACKGROUND OF THE INVENTION

1. Field of the Invention

This invention generally relates to an information device for use in a vehicle. In particular, the invention relates to a device for providing an indication about the power position of the vehicle. The invention also relates to a method for providing an indication about the power position of the vehicle.

2. Background Information

In systems where the power position of the vehicle is manipulated by a push-button or the like, it is known to ascertain the current power position by the lighting of an indicator lamp. However, with such lighting of an indicator lamp there may be cases where annoying widow reflections are produced by the lighting conditions when driving at night, for example, and the like.

In non-patent reference document 1 (Toyota Crown new type vehicle manual Dec. 2003 (page 3-220)), a description is given about how an indicator lamp is extinguished when the power position is OFF and during engine running. It is possible to prevent the occurrence of reflections in the window while driving by extinguishing the indicator lamp when the engine is running.

However, with the technology disclosed in the reference document 1, the indicator lamp is also extinguished when the power position is OFF. Therefore in vehicles where the engine noise is quiet, so that it is not possible to tell easily whether the engine is running, there is the problem that it is difficult to decide whether the fact that the indicator lamp is extinguished means that the power position is OFF or that the engine is running. If the user mistakenly takes the extinguished lamp to mean that the power position is OFF although the engine is running, there is a possibility that he would mistakenly push the power button again.

SUMMARY OF THE INVENTION

It is an object of the present invention to provide an information device and method which overcome the aforementioned problems of the prior art.

According to a first aspect of the present invention, there is provided an information device for use with an engine of a vehicle, including lighting means for providing information about a power position of the vehicle, engine running detection means for detecting engine running and gear shift position detection means for detecting gear shift position. Illuminance control means controls illuminance of said lighting means so that, when a detection is made by the engine running detection means that the engine is running and by the gear shift position detection means that the gear shift position is other than in a P range or N range, the illuminance control means reduces the illuminance of the lighting means compared with the illuminance of the lighting means when the gear shift position is in the P range or N range.

The information device is thus provided with a means of lighting, which gives information about the power position of the vehicle, a means of detecting running, which detects that the engine is running, and a means of shift position detection, which detects the shift position. Also, the means of illuminance control reduces the illuminance of the means of lighting in comparison with the operating situation where the engine is running and the shift position is in the P range or N range when a detection is made by the means of detecting running and the means of shift position detection that the engine is running and that the shift position is other than in the P range or N range.

Through this invention it is possible to prevent annoyance such as window reflections while driving and, at the same time, to prevent the mistaken understanding that the power position is OFF. The invention also allows accurate detection of the power position.

In one embodiment, the illuminance control means is operable so that, when the illuminance of the lighting means has been reduced and a detection is made by the engine running detection means and the gear shift position detection means that the operating situation has become one where the gear shift position is in the P range or N range from an operating situation where the engine was running and the gear shift position was other than in the P range or N range, the illuminance of the lighting means is increased.

The device may further include vehicle speed detection means for detecting vehicle speed, wherein the illuminance control means is further operable to alter the illuminance of the lighting means in response to the detected vehicle speed.

In one preferred embodiment, the illuminance of the lighting means is reduced, in comparison with when the vehicle speed is less than a fixed value of vehicle speed, when a detection is made by the vehicle speed detection means that the vehicle speed is greater than the fixed value. For example, the illuminance control means may be operable so as to extinguish the lighting means altogether when the step of reducing the illuminance is carried out.

Conversely, the illuminance control means may be operable to increase the illuminance of the lighting means when a detection is made by the vehicle speed detection means that the operating situation has changed from one in which the vehicle speed was above a fixed value to an operating situation where the vehicle speed is reduced below the fixed value.

In this way, unsightly reflections of the lighting means in the window when the vehicle is being driven can be avoided as the device automatically adjusts the illuminance of the lighting means when the vehicle speed is increased above a predetermined value.

In a further preferred embodiment, the lighting means is mountable within a vehicle instrument panel.

Preferably, the lighting means is provided in an engine start switch. The lighting means may be further provided in a power position indicator lamp.

In one preferred embodiment, the illuminance control means includes a CPU of an engine control unit.

According to a second aspect of the invention, there is provided an information device for use with an engine of a vehicle, the device including lighting means for providing information about a power position of the vehicle, vehicle speed detection means for detecting vehicle speed, and illuminance control means for controlling illuminance of said lighting means in response to vehicle speed so that, when a detection is made that the vehicle speed is less than a fixed value of vehicle speed the illuminance of the lighting means is increased compared with the illuminance of the lighting means when the vehicle speed is higher than the fixed value.

In this aspect, the invention is therefore provided with a means of lighting, which gives information about the power position of the vehicle, and a means of detecting vehicle speed, which detects the vehicle speed, and a means of illuminance control, which reduces the illuminance of the means of lighting in comparison with the case where the vehicle speed is less than a fixed value of vehicle speed when a detection is made by the means of detecting vehicle speed that the vehicle speed is greater than the fixed value.

It will be appreciated that optional or preferred features of the first aspect of the invention may be incorporated within the second aspect of the invention also, alone or in appropriate combination.

According to a third aspect of the invention, there is provided a method of displaying power position information in a vehicle, the method including providing a lighting means for providing information about the power position of the vehicle, detecting whether the engine is running or not running, detecting an engine gear shift position, and controlling illuminance of said lighting means in response to the detection engine running condition and the detected engine gear shift position. The illuminance is controlled so as to be reduced in comparison with an operating situation where the engine is running and the gear shift position is in a P or N range when a detection is made of an operating situation where the engine is running and the gear shift position is other than the P or N range.

The method may further comprise providing a lighting means in at least one of an engine start switch or a power position indicator lamp.

According to a fourth aspect of the invention, there is provided a method of displaying power position information in a vehicle, the method including providing a lighting means for providing information about a power position of the vehicle, detecting the vehicle speed, comparing the detected vehicle speed with a fixed vehicle speed, and controlling illuminance of said lighting means in response to the comparison. The illuminance is controlled so as to be reduced in comparison with an operating situation where the vehicle speed is less than the fixed vehicle speed when the comparison indicates that an operating situation has a vehicle speed greater than the fixed vehicle speed.

Preferred and/or optional aspects of the device of the first and second aspects of the invention may be implemented in the methods of the third and fourth aspects of the invention, alone or in appropriate combination.

BRIEF DESCRIPTION OF THE DRAWINGS

The invention will now be described, by way of example only, with reference to the following drawings in which.

DETAILED DESCRIPTION OF THE PREFERRED EMBODIMENTS

Figure 1:
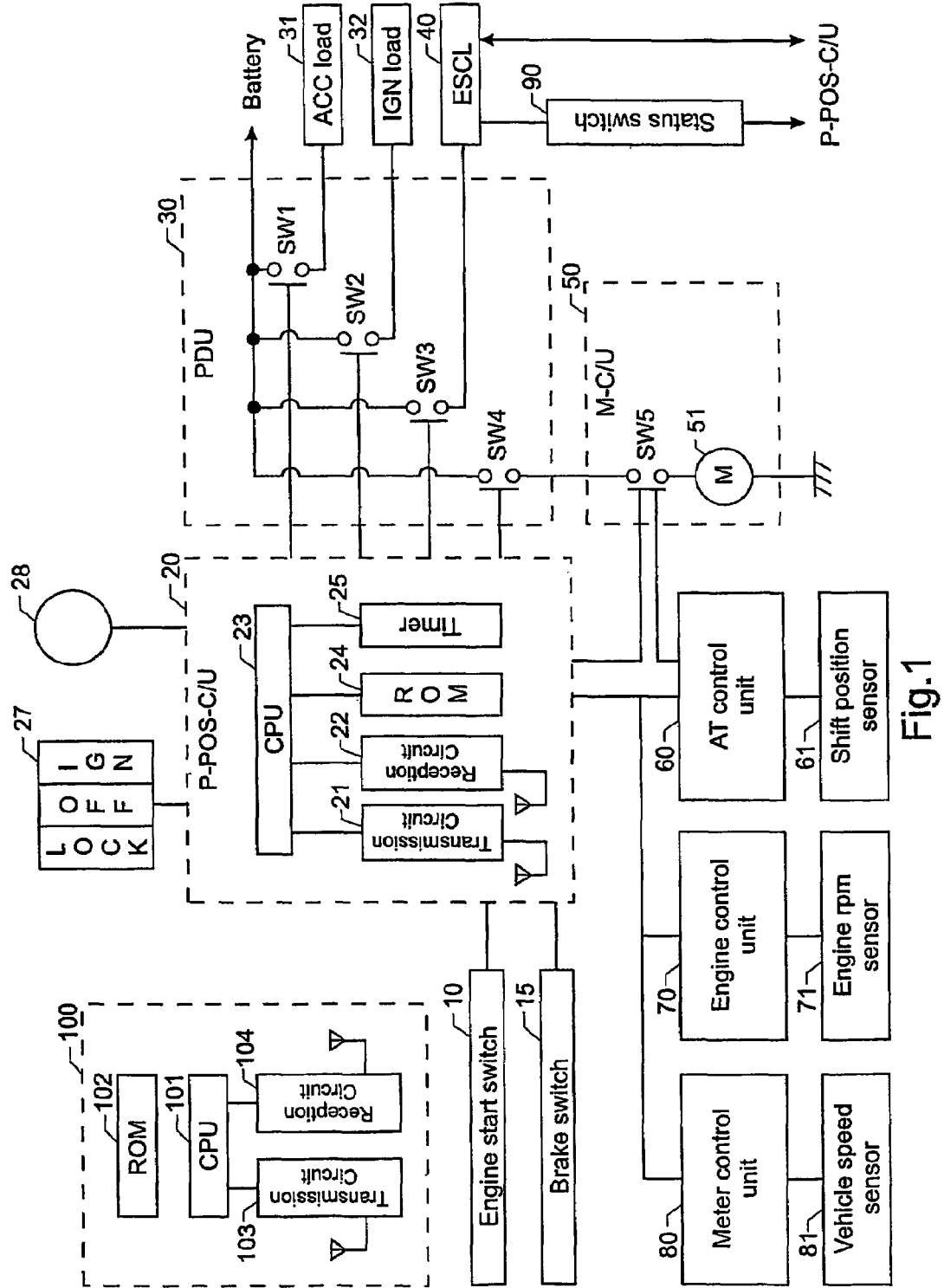
FIG. 1 is a block diagram showing an example of the configuration of an engine control device in which the information device of the first embodiment of this invention is applied.

FIG. 1 is a block diagram showing an example of the configuration of an engine control device where the status information device of this invention is embodied. An explanation will first of all be made by means of FIG. 1 about the configuration of this first form of embodiment of the invention.

An engine start switch 10 is a push-button type of switch that is operated by the driver when the engine, not shown in the diagram, is started. The start switch 10 is conveniently housed within the instrument panel of the vehicle. If the start switch 10 is pushed when the prescribed conditions are met, engine starting control is begun. The engine start switch 10 is also used when moving to the various power positions when the engine is stopped during operation. A brake switch 15 is made ON when the brake, not shown in the diagram, is applied by the driver treading on a brake activator or brake pedal (not shown).

An illuminance control means in the form of a power position control unit (hereinafter referred to as P-POS-C/U) 20 is provided with a transmission circuit 21 and a reception circuit 22, a CPU 23, a ROM 24 and a timer 25. The transmission circuit 21 and the reception circuit 22 carry out transmission and reception between them and transmission circuit 103 and a reception circuit 104 of a portable key (the vehicle key) 100 that is carried by the driver. The portable key 100 is also provided with a CPU 101 and a ROM 102. The CPU 23 carries out an ID check with the portable key 100 and also carries out control of the power position, including engine start control. Details of engine start control and power position control are given later. Through this the ID is verified, using the ID stored in the portable key 100 and the ID stored in the ROM 24 of the P-POS-C/U 20 and, thus, by this means the door lock/unlock is implemented. The timer 25 measures the continuous time of engine cranking.

A power position indicator lamp 27 is provided inside the vehicle meter box on the vehicle instrument panel and is furnished with a luminous element, such as an LED, that indicates the current power position, for example, LOCK, OFF, IGN and the like. The power position indicator lamp 27 has its state of light ON/OFF controlled by the P-POS-C/U 20 and provides information about the power position of the vehicle. Details of the power positions are given later.

A start switch indicator lamp 28 is provided with a luminous element, such as an LED, and is housed inside the push-button moveable part of the engine start switch 10. Start switch indicator lamp 28 has its state of light ON/OFF controlled by the P-POS-C/U 20. Lighting is initiated by unlocking the door and it gives information about the power position by being a different colour, or being ON or OFF, depending upon the various power positions. Furthermore, the initiation of the lighting of the start switch indicator lamp 28 is not limited to the unlocking of the door; it may also be done when the driver's door is opened and the like.

A PDU (power distribution unit) 30 is provided with switches SW1 to SW4 for changing the power position. One end of each of the switches SW1 to SW4 is connected to the vehicle battery. ON/OFF for the switches is executed on the basis of commands from the P-POS-C/U 20. The other end of the switch SW1 is connected to an ACC load 31. When the switch SW1 is made ON, power is supplied to the ACC load 31. The ACC load 31 is, for example, audio equipment. The other end of the switch SW2 is connected to an IGN load 32. When the switch SW2 is made ON, power is supplied to the IGN load 32. The IGN load 32 is, for example, a lighting device, not shown in the diagram. The other end of the switch SW3 is connected to an electric motor-operated steering column lock (hereinafter referred to as ESCL) 40, for example. The ESCL 40 executes, for example, lock/unlock of the steering, not shown in the diagram. A status switch 90 is a switch that is made ON/OFF on the basis of a LOCK/UNLOCK state of the steering.

A motor control unit (hereinafter referred to as M-C/U) 50 is provided with a switch SW5 and a starter motor 51. The switch SW5 is positioned between the switch SW4 and the starter motor 51. The switch SW5 is made ON when an ON command signal is output from the P-POS-C/U 20 and a signal is output from the AT control unit 60, described later, showing that the shift position is in the P (Park) or N (Neutral) gear shift position. If the switches SW4 and SW5 are made ON, power is supplied to the starter motor 51 and hence the starter motor 51 is driven. Through this, cranking commences and engine starting is carried out.

The AT control unit 60 controls the automatic transmission (hereinafter referred to as AT). A shift position sensor 61 detects the shift position (that is, the gear shift position) and outputs a signal to the AT control unit 60.

An engine control unit 70 carries out engine control and, in addition, it outputs a signal showing that the engine is being started (that is, during cranking) or a signal showing that there is a state of complete combustion, which is the state where the engine has started, to the P-POS-C/U 20. An engine rpm sensor 71 detects the engine rpm. A vehicle speed sensor 81 detects the speed of the vehicle. The vehicle speed that is detected is output to the P-POS-C/U 20 via a meter control unit 80. The P-POS-C/U 20, the AT control unit 60, the engine control unit 70 and the meter control unit 80 are respectively connected by CAN communications line.

In the engine control device in which the first form of embodiment is applied, engine starting control and power position control are executed by pressing engine start switch 10. Hitherto, the various power positions are controlled on the basis of the rotational position of the ignition key, whereas in the present invention this is not the case; in the present invention movement to the various positions (such as LOCK, OFF and IGN) is controlled by the P-POS-C/U 20.

With regard to the power position indicator lamp 27, LOCK is a state where the steering is locked and it is a state where all of the switches SW1 to SW5 are made OFF and there is no supply of power. OFF is a state where the steering is unlocked and it is a state where the switch SW1 only is made ON and power is supplied to the ACC load 31. IGN is a state where the steering is unlocked and it is a state where the switches SW1 and SW2 are made ON and power is supplied to the ACC load 31 and the IGN load 32.

The operation of the engine control device of FIG. 1 will now be described with reference to FIGS. 2 to 4.

Figure 2:
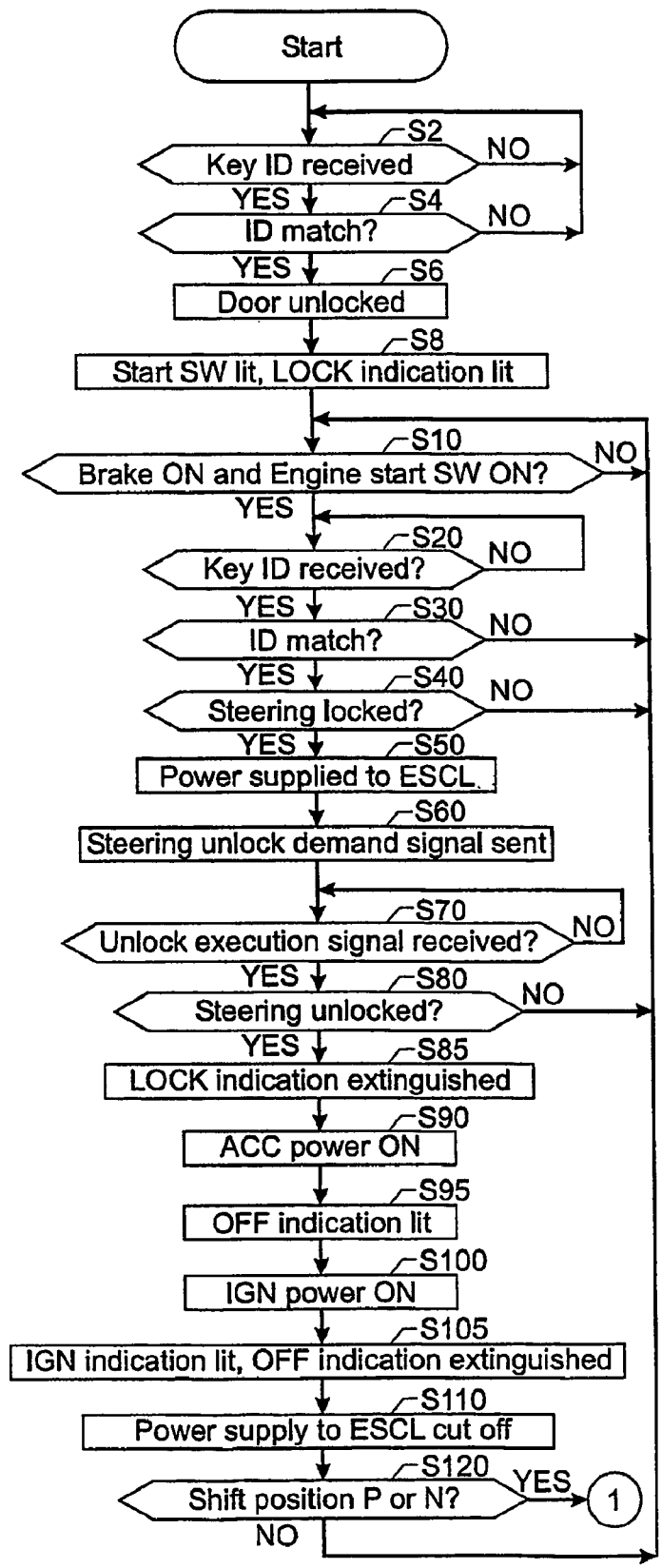
FIG. 2 is a flow chart showing the starting process operation of the engine control device in FIG. 1.
Figure 3:
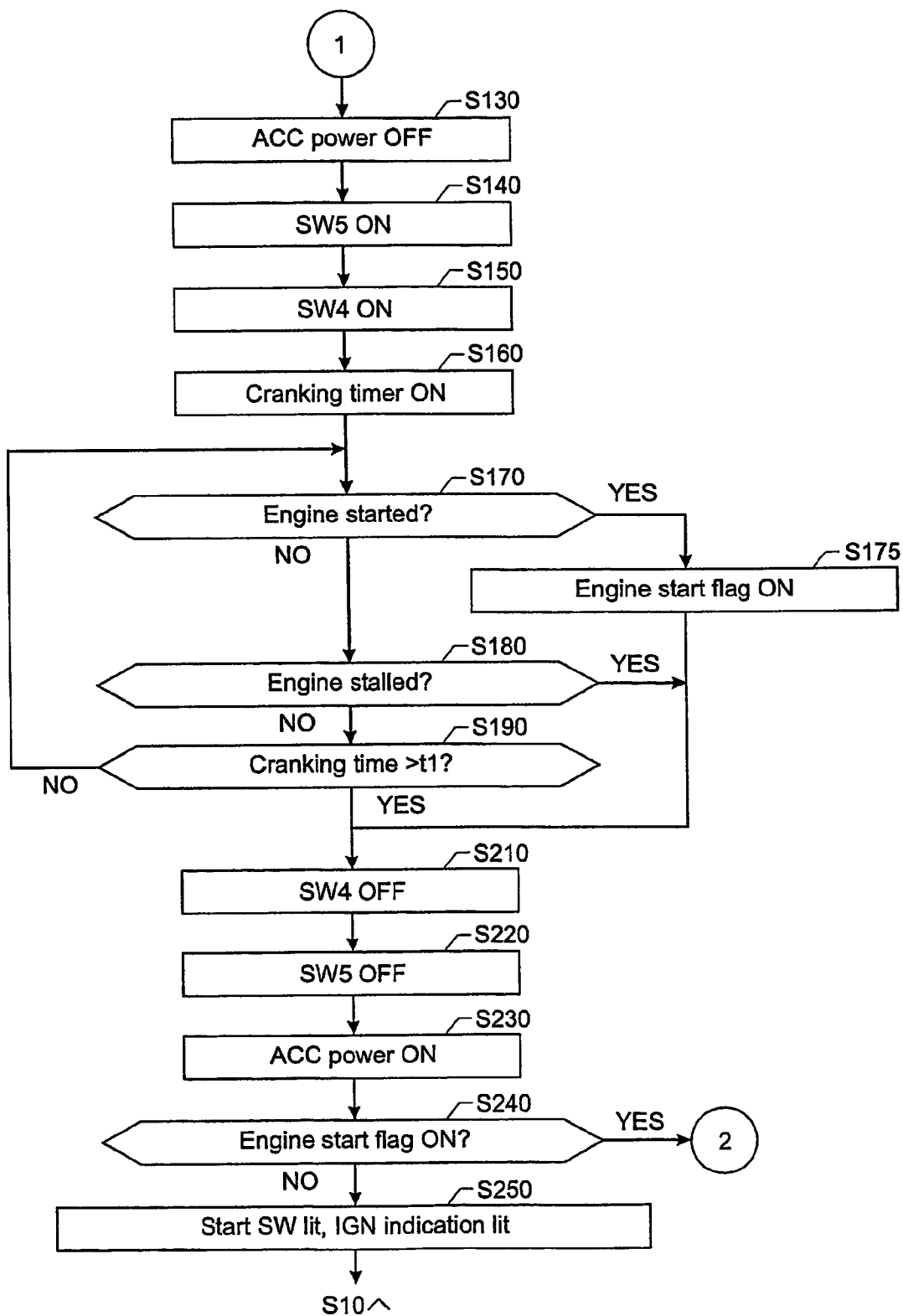
FIG. 3 is a flow chart showing the starting process operation of the engine control device in FIG. 1.
Figure 4:
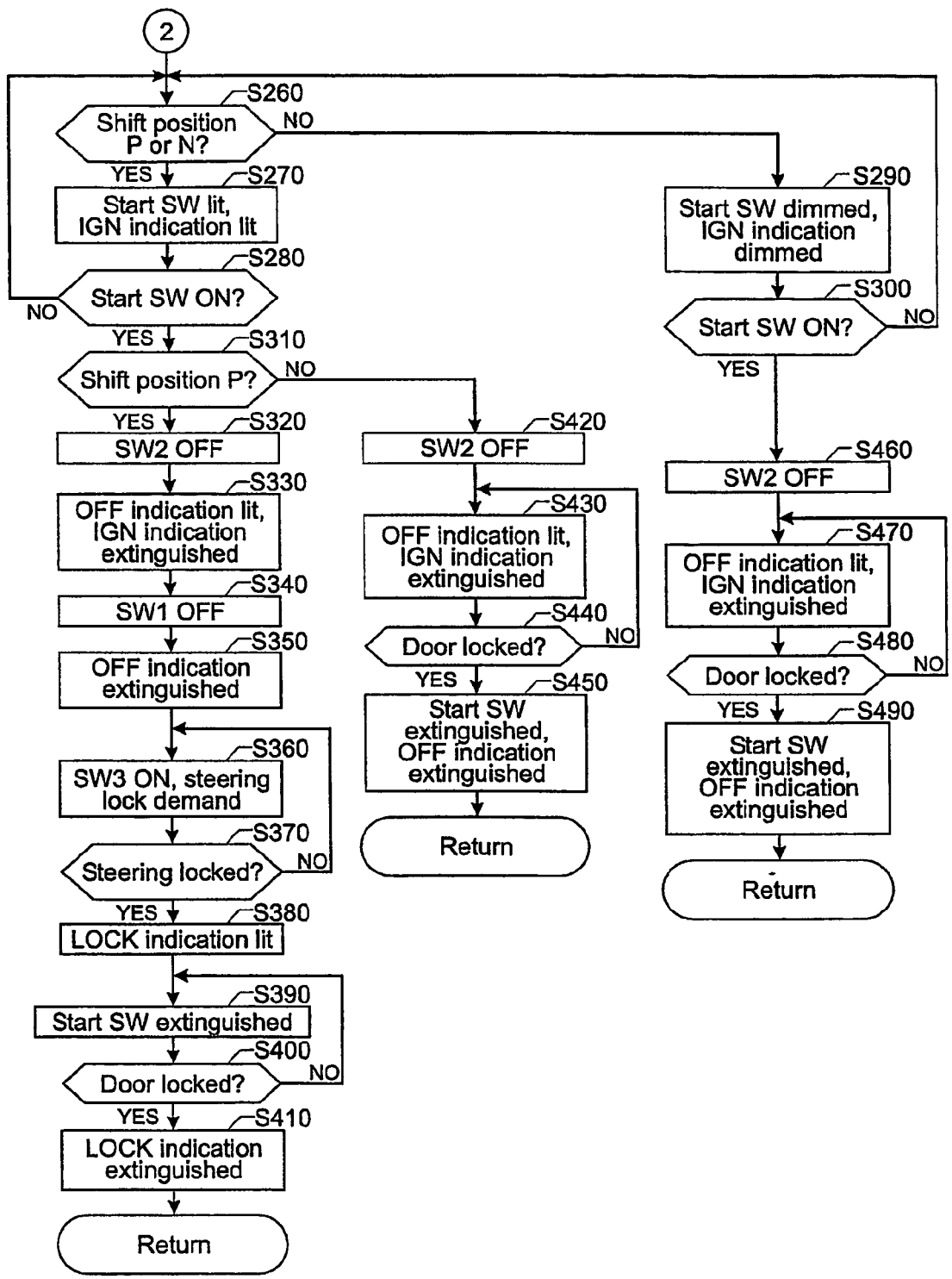
FIG. 4 is a flow chart showing the operating process of the engine control device in FIG. 1 after starting.

FIG. 2 to FIG. 4 are flow charts showing the operating process of the engine control device of the first embodiment. This process is executed by the CPU 23 of the P-POS-C/U 20. The process will now be explained starting from the point where the driver intends to enter the vehicle and the door is unlocked. Initially, the engine starting control process will be described.

In step S2, key ID is received from the portable key 100 via the reception circuit 22. First of all, the CPU 23 of the P-POS-C/U 20 demands ID transmission from the portable key 100 via the transmission circuit 21. The portable key 100, which has received this demand in the reception circuit 104, transmits the ID that is particular to each portable key 100 via the transmission circuit 103. The reception circuit 22 in the P-POS-C/U 20 receives this transmitted ID.

If key ID is received (step S2: YES), identification is carried out in step S4, using the ID stored beforehand in the ROM 24 of the P-POS-C/U 20. If the result of the verification is that the received ID and the ID stored in the ROM 24 match (step S4: YES), the door is unlocked in step S6. When the door is unlocked, the LOCK indication of the power position indicator lamp 27 is lit in step S8 and, in addition, the start switch indicator lamp 28 is lit. If the result of the key ID verification is that there is not a match (step S4: NO), there is a return to the beginning and the process is carried out again.

Next, in step S10 a decision is made as to whether or not the engine start switch 10 was pushed in a state where the brake was applied by the driver. If a signal is input that the brake switch 15 was made ON and a signal is input showing that the engine start switch 10 has been pushed, a decision is made that the engine start switch 10 was pushed in a state where the brake was applied and it goes on to step S20. In cases other than this the process waits at step S10.

In step S20 the key ID is again received from the portable key 100. The process goes on to step S30 and the ID is verified. If in the ID verification a decision is made that the ID matches, it goes on to step S40. If a decision is made that the ID does not match, the engine cannot be started and it returns to step S10.

In step S40 a decision is made as to whether or not the steering is locked, based on a signal input from the status switch 90. If a decision is made that the steering is locked, the process goes on to step S50. If a decision is made that it is unlocked, the process returns to step S11.

In step S50, the switch SW3 in the PDU 30 is made ON. Through this, power is supplied to the ESCL 40. In the next step S60 a steering unlock demand signal is transmitted to the ESCL 40. The ESCL 40, which receives the unlock demand signal, releases the steering lock.

In the next step S70 a decision is made as to whether or not a signal has been received from ESCL 40 showing that steering unlock control has been executed. If a signal is received showing that unlock control has been executed, the process goes on to step S80. If the decision is that it has not been received, the process waits at step S70 until this signal is received.

In step S80 a decision is made as to whether or not the steering has been unlocked, based on a signal input from the status switch 90. If the decision is that the steering has been unlocked, the process goes on to step S85 and the LOCK indication of the power position indicator lamp 27 is extinguished. If the decision is that it has not been unlocked, the process returns to step S10.

In the next step S90, the switch SW1 in the PDU 30 is made ON. Through this, power is supplied to the ACC load 31. Moreover, a check is made that power has been supplied to the ACC load 31 by the receipt from the PDU 30 of a signal showing that a current is flowing in the ACC load 31. It then goes on to step 95 and the OFF indicator is lit.

In the next step S100, the switch SW2 in the PDU 30 is made ON. Through this, power is supplied to the IGN load 32. Furthermore, the P-POS-C/U 20 checks that the power position has moved to IGN by the receipt of a signal from the PDU 30 showing that a current is flowing in the IGN load 32. Then, in the next step S105, the OFF indication of the power position indicator lamp 27 is extinguished and the IGN indication is lit.

In the next step S110, the switch SW3 in the PCU 30 is made OFF. Through this the supply of power to the ESCL 40 is cut off. When the switch SW3 is made OFF, the process goes on to step S120. In step S120, a decision is made as to whether or not the shift position detected by the shift position sensor 61 is P or N. If the decision is that the shift position is P or N, the process goes on to step S130. If the decision is that the position is other than in P or N range, the process returns to step S10 without the engine being able to be started (i.e. the engine can only be started when the engine shift position is either Park or Neutral).

In step S130 in the flow chart shown in FIG. 3, the switch SW1 in the PDU 30 is made OFF. If, in conjunction with this, a signal is received from the PDU 30 showing that a current is not flowing in the ACC load 31, the process goes on to step S140. In step S140 an ON command signal for switch SW5 is sent to the M-C/U 50. As stated above, the switch SW5 becomes ON when the shift position is P or N and a switch ON command signal is input from the P-POS-C/U 20. As it has been confirmed in the decision in step 120 that the shift position is P or N, the switch SW5 is made ON in step S140.

In the next step S150, the switch SW4 in the PDU 30 is made ON. Through this, a current flows in the starter motor 51 and engine cranking is begun. When engine cranking is begun, the engine control unit 70 transmits to the P-POS-C/U 20 a signal showing that engine cranking is in progress. In the next step S160, when it is confirmed that cranking has begun on the basis of the signal input from the engine control unit 70, measurement of the continuous cranking time is begun by the timer 25.

In the next step S170, a decision is made as to whether or not the engine has started, based on a signal showing the engine status input from the engine control unit 70. If the decision is that the engine has started, the process goes on to step S210 after raising the engine start flag in step S175. If the decision is that the engine has not started, the process goes on to step S180.

In step S180 a decision is made as to whether or not the engine has stalled (stopped), based on a signal showing the engine status that is input from the engine control unit 70. If the decision is that the engine has stalled, the process goes on to step S210. If the decision is that the engine has not stalled and cranking is continuing, the process goes on to step S190.

In step S190 a decision is made as to whether or not the continuous cranking time measured by the timer 25 has or has not exceeded the prescribed time t1. If the decision is that the continuous cranking time has not exceeded the prescribed time t1, the process-returns to step S170 with the cranking still continuing. On the other hand, if the decision is that the continuous cranking time has exceeded the prescribed time t1, the process goes on to step S210.

In step S210, the switch SW4 in the PDU 30 is made OFF and the process goes on to step S220. In step S220, a switch SW5 OFF command signal is sent to the M-C/U 50. Through this, the switch SW5 is made OFF. In the next step S230, the switch SW1 in the PDU 30 is made ON and power is supplied to the ACC load 31.

In the next step S240, a decision is made as to whether or not the engine start flag is ON. As stated above, if the decision in step S170 is YES, the engine start flag becomes ON, but if it has gone on to this step S240 without the decision in step S170 being YES, the engine start flag does not become ON because the engine has not started. If the decision is that the engine start flag has not become ON, in step S250 the IGN indication of the power position indicator lamp 27 is lit, the start switch indicator lamp 28 is lit and the process returns to step S10. In other words, if the engine start switch 10 is pushed again with the brake still applied, cranking to start the engine is again carried out.

The process of controlling the indicator lamp during engine operation will now be described.

If a decision is made in step S240 that the engine start flag has become ON, it moves to step S260 in FIG. 4. Here, because the engine has been started, the vehicle can be driven in accordance with the handling by the driver. In particular, in this form of embodiment the illuminance of the power position indicator lamp 27 or the start switch indicator lamp 28 is increased and decreased during engine operation, depending on the gear shift position.

In step S240 in FIG. 4, a decision is made as to whether or not the shift position is P or N, based on the output from the shift position sensor 61. At the outset of engine starting the shift position is normally P or N, the decision in step S260 is YES and the process moves on to step S270.

In step S270 the IGN indication of the power position indicator lamp 27 is lit and the start switch indicator lamp 28 is lit. The illuminance of the power position indicator lamp 27 or the start switch indicator lamp 28 in this case may be the same illuminance as that when the lamps 27, 28 were lit in step S105 or step S8, or the illuminance may be different to this. In the next step 280 the process returns to step S260 and the shift position decision and indicator lamp control are repeated until a decision is made that engine start switch 10 has been pushed.

On the other hand, if the decision in step S260 is that the shift position is other than P or N, that is, D (Drive), R (Reverse) and so on, the process moves to step S290.

In step S290 the illuminance of the power position indicator lamp 27 (IGN) is reduced from what it was in step S105 and step S270. Furthermore, the illuminance of the start switch indicator lamp 28 is reduced from what it was in step S8 and step S270. Saying the illuminance is reduced may mean any degree of reduction, irrespective of the extent of the reduction, and may include the lamp(s) being extinguished.

In the next step S300 the process returns to step S260 and the shift position decision and indicator lamp control are repeated until a decision is made that the engine start switch 10 has been pushed. For example, if the decision in step S260 is again NO, the above reduced illuminance of the power position indicator lamp 27 or the start switch indicator lamp 28 is maintained by step S290. Conversely, if the decision in step S260 is YES, the illuminance of the power position indicator lamp 27 and/or of the start switch indicator lamp 28 is increased in step S270 and returned to its former illuminance.

The process of controlling engine stopping (when in P range) will now be described.

If the decision is made in step S280 or step S300 that engine start switch 10 has been pushed, it goes into an action which stops the engine during running. As the action of stopping differs depending on the state of the shift position when the engine start switch 10 was pushed, an explanation will be given about these.

In general terms, if the shift position is in the P range, the power supply to the IGN load 32 and the ACC load 31 is cut off, the steering lock is made LOCK and the start switch indicator lamp 28 is extinguished. This sequence is described in further detail below.

If a decision is made in step S280 that the engine start switch 10 has been pushed and a decision is made in the next step S310 that the shift position is in P range, switch SW2 is made OFF first of all in step S320. As the power supply to the IGN load 32 is cut off by this event, the engine stops. In the next step S330 the IGN indication of the power position indicator lamp 27 is extinguished and instead the OFF indication of the power position indicator lamp 27 is lit.

In the next step S340, the switch SW1 is made OFF. Through this the power supply to the ACC load 31 is cut off. In the next step S350, the OFF indication of the power position indicator lamp 27 is extinguished.

In the next step S360, the switch SW3 is made ON. In addition to this, steering lock is demanded from the ESCL 40. In the next step S370, a decision is made as to the ON/OFF state of the status switch 90. If the steering is not locked, the process returns to step S360 and again demands steering lock. If the steering is locked, the LOCK indication of the power position indicator lamp 27 is lit in step S380.

In the next step S390, the start switch indicator lamp 28 is extinguished and in the next step S400 a decision is made as to whether or not the door is locked, based on the output of a door lock sensor that is not shown in the diagram. If the door is not locked, the process returns to step S390. If the door is locked, the LOCK indication of the power position indicator lamp 27 is extinguished in the next step S410 and the process sequence ends.

The process of controlling engine stopping (when in N range) will now be described.

If the shift position is in the N range when engine start switch 10 is pushed when the engine is running, the power supply to the IGN load 32 is cut off and the start switch indicator lamp 28 is extinguished. The ACC load 31 is not cut off and the steering is not locked. This part of the process will be described in further detail below.

If a decision is made in step S310 that the shift position is in N range, first of all the switch SW2 is made OFF in step S420. As the power supply to the IGN load 32 is cut off by this, the engine stops. In the next step S430, the IGN indication of the power position indicator lamp 27 is extinguished and the OFF indication of the power position indicator lamp 27 is lit.

In the next step S440, a decision is made as to whether or not the door is locked, based on the output of the door lock sensor (not shown in the diagram). If the door is not locked, the process returns to step S430. If the door is locked, in the next step S450 the OFF indication of the power position indicator lamp 27 is extinguished, the start switch indicator lamp 28 is extinguished and the process sequence ends.

The process of controlling engine stopping (when in D, R range etc.) will now be described.

If the shift position is other than P or N range when the engine start switch 10 is pushed when the engine is running, the power supply to the IGN load 32 is cut off, as will be explained next. The ACC load 31 is not cut off and the steering is not locked.

If a decision is made in step S300 that the engine start switch 10 has been pushed, first of all in step S460 the switch SW2 is made OFF. As the power supply to the IGN load 32 is cut off by this, the engine stops. In the next step S470, the OFF indication of the power position indicator lamp 27 is lit. In this case the illuminance of the light of the OFF indication of the power position indicator lamp 27 is not a low illuminance as in step S290 but is of the normal illuminance, as when it was lit in step S85. Moreover, if the IGN indication of the power position indicator lamp 27 was lit at a low illuminance in step S290 without being extinguished, the IGN indication is extinguished in this step S470.

In the next step S480, a decision is made as to whether or not the door is locked, based on the output of a door lock sensor (not shown in the diagram). If the door is not locked, the process returns to step S470. If the door is locked, in the next step S490 the OFF indication of the power position indicator lamp 27 is extinguished and the process sequence ends. Moreover, if the start switch indicator lamp 28 was lit at a low illuminance in step S290 without being extinguished, the start switch indicator lamp 28 is extinguished in step S490.

Through this form of embodiment, as detection is made that the engine is running and the shift position is D range, R range and the like and the illuminance of the power position indicator lamp 27 or the start switch indicator lamp 28 is reduced, annoying reflections in the window that occur during travel, and when intending to travel, can be avoided. In addition, power consumption can be reduced by reducing the illuminance of the power position indicator lamp 27 and/or the start switch indicator lamp 28. In addition, as the user can accurately distinguish the situation when he is about to drive through the shift position, the mistaken understanding that the power is OFF can be prevented even though the illuminance is reduced. Consequently, the power position can be known accurately.

Furthermore, in this form of embodiment as the illuminance of the power position indicator lamp 27 or the start switch indicator lamp 28 is increased when a detection is made that the engine is not running, or that the shift position is in P range or in N range, the illuminance can be increased without the user having the inconvenience of having to adjust the lights.

Also, in this form of embodiment if the illuminance of the power position indicator lamp 27 or the start switch indicator lamp 28 is reduced to zero (that is to say, if the power position indicator lamp 27 or the start switch indicator lamp 28 is extinguished), troublesome reflections in the window do not occur at all while driving.

Figure 5:
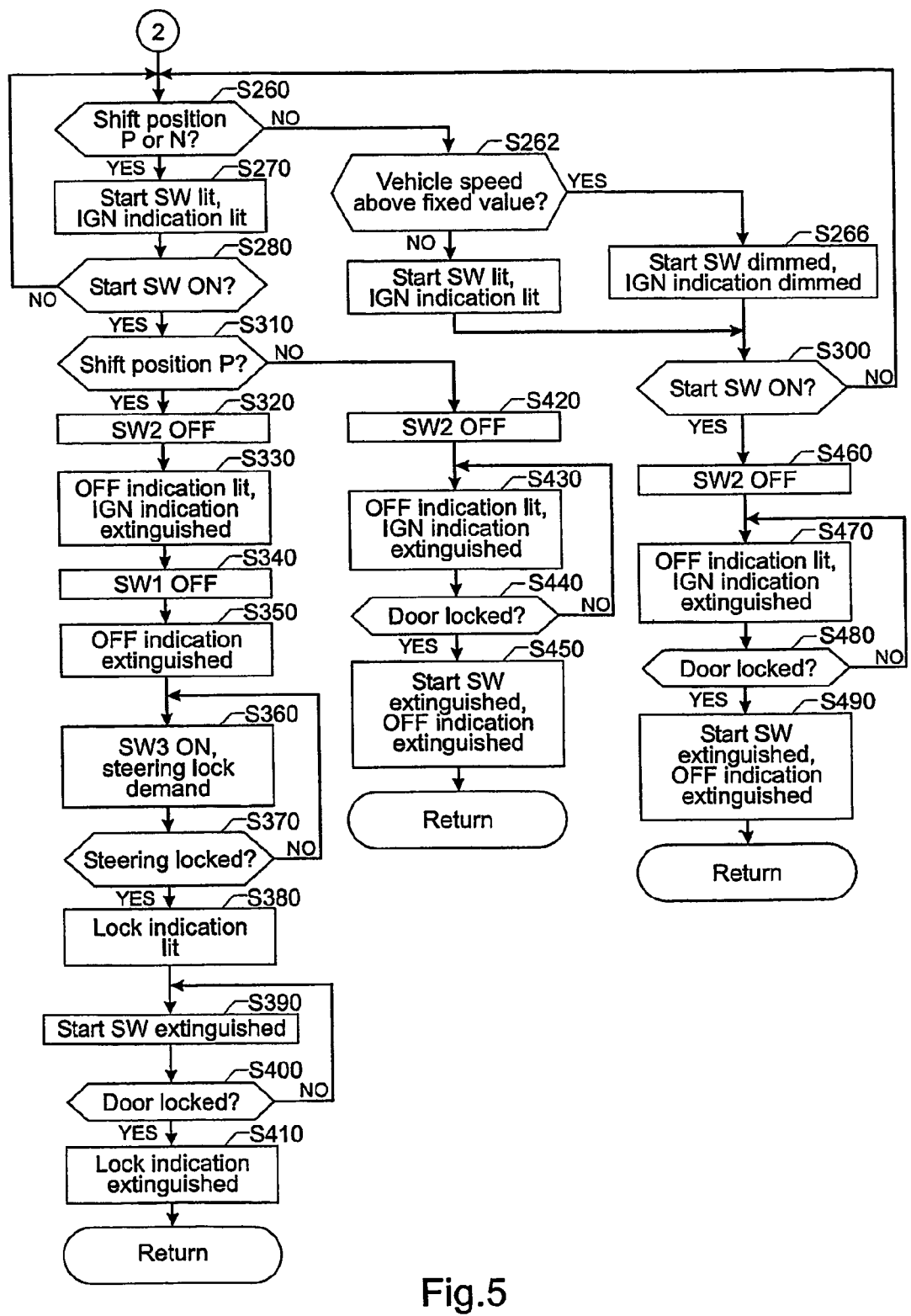
FIG. 5 is a flow chart the operating process of an engine control device similar in part to that shown in FIG. 1, but in which an information device of the second embodiment of this invention is applied.

FIG. 5 is a flow chart which shows parts corresponding to FIG. 4 of the first embodiment in the action process of an engine control device where the information device of the second embodiment of this invention is applied. Here, an explanation is only given about the points of difference from the first embodiment, based on FIG. 5. As the remaining parts are the same as the first embodiment, a detailed explanation of these parts is omitted.

Referring to FIG. 5, in the action process in the second embodiment, if a decision is made in step S260 that the shift position is other than P or N, a decision is made about the vehicle speed in new step S262, based on the output of the vehicle speed sensor 81 (as shown in FIG. 1).

If the result of the vehicle speed decision in step S262 is that it is lower than a fixed vehicle speed, the IGN indication of the power position indicator lamp 27 is lit and the start switch indicator lamp 28 is lit at step S264. The illuminance of the power position indicator lamp 27 or the start switch indicator lamp 28 in this case may be the same illuminance as that when they are lit in step S105 or step S8 and step S270, or it may be a different illuminance. In the next step S300 the process returns to step S260 and makes a decision about the shift position until a decision is made that the engine start switch 10 has been pushed.

On the other hand, if the result of the vehicle speed decision in step S262 is that it is above a fixed vehicle speed, in step S266 the illuminance of the power position indicator lamp 27 (IGN) is made lower than in the case of step S105 and step S270. Furthermore, the illuminance of the start switch indicator lamp 28 is made lower than in the case of step S8 and step S270. When reference is made to the illuminance being low, irrespective of the extent of the low illuminance the light may actually be extinguished.

In the next step S300, the process returns to step S260 and makes the decision about the shift position until a decision is made that the engine start switch 10 has been pushed. If a decision is made in step S260 that the shift position is again other than P or N, and if the decision in step S262 is again YES, the power position indicator lamp 27 or the start switch indicator lamp 28 are maintained at the above low illuminance. Conversely, if the decision in step S260 is NO, the illuminance of the power position indicator lamp 27 or the start switch indicator lamp 28 is raised in step S270 and returns to its former illuminance. Thus, the control of the illuminance may be based on the vehicle speed.

The fixed vehicle speed in step S262 may, for example, be 5 km/h but it may equally be some other value. The decision may be one of whether the vehicle is moving or stopped and so, for example, the fixed vehicle speed may be 0 km/h.

For this second embodiment, as a detection is made that the vehicle speed is above a fixed value and the illuminance of the power position indicator lamp 27 or the start switch indicator lamp 28 is reduced, it is possible to prevent the occurrence of troublesome window reflections while the vehicle is travelling faster than the fixed vehicle speed. In addition, because the vehicle is travelling it is possible to prevent with certainty an erroneous assumption of a power OFF status, even though the illuminance is reduced. Consequently, it is possible to give information accurately about the power position.

Furthermore, in this second embodiment, if a detection is made that the vehicle speed is below the fixed vehicle speed, the illuminance of the power position indicator lamp 27 or the start switch indicator lamp 28 is increased and therefore the illuminance can be increased without giving the user the inconvenience of having to adjust the lights.

Also in this second embodiment, if the illuminance of the power position indicator lamp 27 or the start switch indicator lamp 28 is reduced to zero (that is to say, if the power position indicator lamp 27 or the start switch indicator lamp 28 is extinguished), there is no occurrence of troublesome window reflections when travelling above a fixed vehicle speed.

In the above respective embodiments, the power position indicator lamp 27 and/or the start switch indicator lamp 28 correspond to the means of lighting in this invention; the shift position sensor 61 corresponds to the means of gear shift position detection in this invention; the engine control unit 70 corresponds to the means for functioning information in this invention; and the vehicle speed sensor 81 corresponds to the means of detecting vehicle speed in this invention.

The invention claimed is:

1. An information device for use with an engine of a vehicle, the information device comprising:
  a lighting device for providing information about a power position of the vehicle;
  an engine running detection device for detecting engine running;
  a gear shift position detection device for detecting gear shift position; and
  an illuminance control device for controlling illuminance of the lighting device so that, when a detection is made by the engine running detection device that the engine is running and by the gear shift position detection device that the gear shift position is other than in a P range or a N range, the illuminance control device reduces the illuminance of the lighting device compared with the illuminance of the lighting device when the gear shift position is in the P range or the N range.

2. The information device as claimed in claim 1, wherein the illuminance control device is operable so that, when the illuminance of the lighting device has been reduced and a detection is made by the engine running detection device and the gear shift position detection device that the operating situation has become one where the gear shift position is in the P range or the N range from an operating situation where the engine was running and the gear shift position was other than in the P range or the N range, the illuminance of the lighting device is increased.

3. The information device as claimed in claim 1, further comprising
  a vehicle speed detection device for detecting vehicle speed, wherein the illuminance control device is operable to alter the illuminance of the lighting device in response to the detected vehicle speed.

4. The information device as claimed in claim 3, wherein the illuminance control device is operable to reduce the illuminance of the lighting device, in comparison with when the vehicle speed is less than a fixed value of vehicle speed, when a detection is made by the vehicle speed detection device that the vehicle speed is greater than the fixed value.

5. The information device as claimed in claim 3, wherein the illuminance control device is operable to increase the illuminance of the lighting device when a detection is made by the vehicle speed detection device that the operating situation has changed from one in which the vehicle speed was above a fixed value to an operating situation where the vehicle speed is reduced below the fixed value.

6. The information device as claimed in claim 4, wherein the illuminance control device is operable so as to extinguish the lighting device when the illuminance is reduced.

7. The information device as claimed in claim 1, wherein the lighting device is mountable within a vehicle instrument panel.

8. The information device as claimed in claim 1, wherein the lighting device is provided in an engine start switch.

9. The information device as claimed in claim 1, wherein the lighting device is provided in a power position indicator lamp.

10. The information device as claimed in claim 1, wherein the illuminance control device includes a CPU of an engine control unit.

11. An information device for use with an engine of a vehicle, the information device comprising:
  a lighting device for providing information about a power position of the vehicle,
  a vehicle speed detection device for detecting vehicle speed, and
  an illuminance control device for controlling illuminance of said lighting device in response to vehicle speed so that, when a detection is made that the vehicle speed is less than a fixed value of vehicle speed the illuminance of the lighting device is increased compared with the illuminance of the lighting device when the vehicle speed is higher than the fixed value.

12. The information device as claimed in claim 11, wherein the illuminance control device is operable to reduce the illuminance of the lighting device, in comparison with when the vehicle speed is less than the fixed value of vehicle speed, when a detection is made by the vehicle speed detection device that the vehicle speed is greater than the fixed value.

13. The information device as claimed in claim 11, wherein
the illuminance control device is operable to increase the illuminance of the lighting device when a detection is made by the vehicle speed detection device that the operating situation has changed from one in which the vehicle speed was above the fixed value to an operating situation where the vehicle speed is reduced below the fixed value.

14. The information device as claimed in claim 12, wherein
the illuminance control device is operable so as to extinguish the lighting device when the illuminance is reduced.

15. A method of displaying power position information in a vehicle, the method comprising:
providing a lighting device for providing information about a power position of the vehicle;
detecting whether the engine is running or not running;
detecting an engine gear shift position; and
controlling illuminance of said lighting device in response to the detection engine running condition and the detected engine gear shift position so that the illuminance is reduced in comparison with an operating situation where the engine is running and the gear shift position is in a P or N range when a detection is made of an operating situation where the engine is running and the gear shift position is other than in the P or N range.

16. The method as claimed in claim 15, further comprising
extinguishing the lighting device altogether during the step of reducing the illuminance.

17. The method as claimed in claim 15, further comprising
detecting vehicle speed and altering the illuminance of the lighting device by the illuminance control device in response to the detected vehicle speed.

18. The method as claimed in claim 17, further comprising
reducing the illuminance of the lighting device, in comparison with when the vehicle speed is less than a fixed value of vehicle speed, when a detection is made by the vehicle speed detection device that the vehicle speed is greater than the fixed value.

19. The method as claimed in claim 17, further comprising
increasing the illuminance of the lighting device when a detection is made by the vehicle speed detection device that the operating situation has changed from one in which the vehicle speed was above a fixed value to an operating situation where the vehicle speed is reduced below the fixed value.

20. A method of displaying power position information in a vehicle, the method comprising:
providing a lighting device for providing information about a power position of the vehicle;
detecting the vehicle speed;
comparing the detected vehicle speed with a fixed value of vehicle speed, and
controlling illuminance of said lighting device in response to the comparison so that the illuminance is reduced in comparison with an operating situation where the vehicle speed is less than the fixed value of vehicle speed when the comparison indicates that an operating situation has a vehicle speed greater than the fixed value of vehicle speed.

21. An information device for use with an engine of a vehicle, the information device comprising:
lighting means for providing information about a power position of the vehicle;
engine running detection means for detecting engine running;
gear shift position detection means for detecting gear shift position; and
illuminance control means for controlling illuminance of the lighting means so that, when a detection is made by the engine running detection means that the engine is running and by the gear shift position detection means that the gear shift position is other than in a P range or a N range, the illuminance control means reduces the illuminance of the lighting means compared with the illuminance of the lighting means when the gear shift position is in the P range or the N range.

22. The information device as claimed in claim 21, wherein
the illuminance control means is operable so that, when the illuminance of the lighting means has been reduced and a detection is made by the engine running detection means and the gear shift position detection means that the operating situation has become one where the gear shift position is in the P range or the N range from an operating situation where the engine was running and the gear shift position was other than in the P range or the N range, the illuminance of the lighting means is increased.

23. The information device as claimed in claim 21, further comprising
vehicle speed detection means for detecting vehicle speed, wherein the illuminance control means is operable to alter the illuminance of the lighting means in response to the detected vehicle speed.

24. The information device as claimed in claim 23, wherein
the illuminance control means is operable to reduce the illuminance of the lighting means, in comparison with when the vehicle speed is less than a fixed value of vehicle speed, when a detection is made by the vehicle speed detection means that the vehicle speed is greater than the fixed value.

25. The information device as claimed in claim 24, wherein
the illuminance control means is operable so as to extinguish the lighting means when the illuminance is reduced.

26. The information device as claimed in claim 23, wherein
the illuminance control means is operable to increase the illuminance of the lighting means when a detection is made by the vehicle speed detection means that the operating situation has changed from one in which the vehicle speed was above a fixed value of vehicle speed to an operating situation where the vehicle speed is reduced below the fixed value.

27. The information device as claimed in claim 21, wherein the lighting means is mountable within a vehicle instrument panel.

28. The information device as claimed in claim 21, wherein
the lighting means is provided in an engine start switch.

29. The information device as claimed in claim 21, wherein
the lighting means is provided in a power position indicator lamp.

30. The information device as claimed in claim 21, wherein
the illuminance control means includes a CPU of an engine control unit.

31. An information device for use with an engine of a vehicle, the information device comprising:
lighting means for providing information about a power position of the vechicle;
vehicle speed detection means for detecting vehicle speed; and
illuminance control means for controlling illuminance of the lighting means in response to vehicle speed so that, when a detection is made that the vehicle speed is less than a fixed value of vehicle speed the illuminance of the lighting means is increased compared with the illuminance of the lighting means when the vehicle speed is higher than the fixed value.

32. The information device as claimed in claim 31, wherein
the illuminance control means is operable to reduce the illuminance of the lighting means, in comparison with when the vehicle speed is less than a fixed value of vehicle speed, when a detection is made by the vehicle speed detection means that the vehicle speed is greater than the fixed value of vehicle speed.

33. The information device as claimed in claim 32, wherein
the illuminance control means is operable so as to extinguish the lighting means when the illuminance is reduced.

34. A method of displaying power position information in a vehicle, the method comprising:
providing a lighting means for providing information about a power position of the vehicle;
detecting whether the engine is running or not running;
detecting an engine gear shift position; and
controlling illuminance of said lighting means in response to the detection engine running condition and the detected engine gear shift position so that the illuminance is reduced in comparison with an operating situation where the engine is running and the gear shift position is in a P or N range when a detection is made of an operating situation where the engine is running and the gear shift position is other than in the P or N range.

35. A method of displaying power position information in a vehicle, the method comprising:
providing a lighting means for providing information about a power position of the vehicle;
detecting the vehicle speed;
comparing the detected vehicle speed with a fixed value of vehicle speed; and
controlling illuminance of said lighting means in response to the comparison so that the illuminance is reduced in comparison with an operating situation where the vehicle speed is less than the fixed vehicle speed when the comparison indicates that an operating situation has a vehicle speed greater than the fixed value of vehicle speed.

36. The method as claimed in claim 34, further comprising
providing the lighting means in at least one of an engine start switch or a power position indicator lamp.

* * * * *